Patented June 3, 1952

2,598,724

UNITED STATES PATENT OFFICE 2,598,724

METHOD FOR INCREASING THE MELTING POINT OF PETROLATUMS AND PRODUCTS RESULTING THEREFROM

Louis Schmerling, Riverside, Ill., assignor to Universal Oil Products Company, Chicago, Ill., a corporation of Delaware No Drawing. Application February 24, 1948, Serial No. 10,586

12 Claims. (Cl. 260—683.4)

This invention relates to hydrocarbon compositions. It is more specifically concerned with a method for increasing the melting point of petroleum waxes, particularly petrolatums.

Petroleum waxes can be divided into two classes, namely, paraffin waxes and petrolatums, also known as ceresin waxes. The paraffin waxes are found in petroleum distillates such as lube oils and have well-defined crystalline structures that may be crystals, plates, or needles. Waxes of this type absorb oil only loosely and usually can be recovered from oils containing the same merely by chilling the stock and filtering the oil from the crystals. On the other hand, petrolatum or ceresin waxes are found in residual stocks and adsorb or absorb oil tenaciously, the separation of which is a much more difficult problem than in the case of paraffin waxes. Usually petrolatums are separated by centrifuging, i. e., stocks containing the same are dissolved in a suitable solvent such as naphtha or a mixture of benzene and acetone, the solution is chilled, and centrifuged. It is generally believed that petrolatums have a microcrystalline structure. In general, they possess a grease-like consistency at room temperature, whereas paraffin waxes are considerably harder as well as higher melting. I have now found that the melting point of petroleum waxes, particularly petrolatums, may be substantially increased by a relatively simple method. The resulting products are new compositions of matter that have higher melting points than the original petrolatum, but which possess substantially the same consistency as the starting material, i. e., they are still grease-like.

In one embodiment my invention relates to the condensation product of ethylene and a petrolatum.

In another embodiment my invention relates to a method of increasing the melting point of petrolatum which comprises subjecting ethylene and a petrolatum to the action of an organic peroxide condensation catalyst at a temperature at least as high as the decomposition temperature of said catalyst.

I have also found that when the peroxide-catalyzed condensation of ethylene and a petrolatum is conducted in the presence of certain metals, even higher yields are obtained and the melting point of the product is higher than is obtained in the absence of said metals. Therefore, in another embodiment, my invention relates to a method of increasing the melting point of petrolatum which comprises subjecting ethylene and a petrolatum to the action of an organic peroxide condensation catalyst at a temperature at least as high as the decomposition temperature of said catalyst and in the presence of a metal selected from the group consisting of magnesium, zinc, cadmium, and mercury.

The petrolatums used in my process may be obtained in any of the usual ways. A preferred class comprises those of relatively low melting point, e. g., less than about 60° C. The higher melting point products produced therefrom can be used for purposes for which the starting material is unsuitable. For example, the products of my process can be used for coating paper, and various types of fabrics; whereas the ordinary naturally-occurring petrolatum, because of its low melting point, cannot. Also, products of my process, especially selected fractions thereof, possess utility as pour point depressants. Thus it can be seen that by increasing the melting point of the petrolatum a product of increased utility is obtained which can be used where softness and amorphous-like properties are desirable, but where low melting point is objectionable.

The ethylene charged to my process may be obtained from any source, such as the dehydrogenation of ethane, the dehydration of ethyl alcohol, and particularly the thermal or catalytic cracking of higher boiling hydrocarbons. Many of the known processes for condensing ethylene with other hydrocarbons require a highly purified charge stock, i. e., the ethylene has to be substantially free from other hydrocarbons and from dissolved oxygen. In contrast, the yield and quality of the product produced in my process are substantially unaffected by the presence of other hydrocarbons, such as ethane, or by the presence of dissolved oxygen. Thus refinery ethane-ethylene fractions may be charged to the process of this invention together with a suitable catalyst and a petrolatum. The olefin is condensed with the petrolatum in good yields and the ethane in the product is simply and inexpensively separated therefrom. There is no need for a costly charge stock purification step, and, as a result, the capital and operating costs of the process are considerably reduced.

The catalysts which may be used in the present process comprise those organic peroxides, particularly hydrocarbon peroxides, which catalyze the condensation of ethylene and petrolatum. These substances include peracetic acid, diacetyl peroxide, toluic acid peroxide, oleic peroxide, benzoyl peroxide, tertiary butyl perbenzoate, ditertiary butyl peroxide, hexyl peroxide, tertiary butyl hydroperoxide, and methylcyclohexylhydroperoxide.

The promoters that may be used in the present process consist of magnesium and the members of the B sub-group of group II of the periodic table, namely, zinc, cadmium, and mercury. These promoters may be added to the reaction zone in their elemental state or in the form of a compound which, under the conditions prevailing in the reaction zone, decomposes to yield the metal. The potency of these promoters is dependent in part upon their physical form, particularly the surface area per unit weight, and it is often preferable to add them in a finely divided state. These metals are specific in their action; for the beneficial effect is not obtained when other metals such as molybdenum, silver, lead, and iron are employed in my process. Nickel and copper appear to act as inhibitors.

The process of my invention may be carried out in batch operation by placing a quantity of the petrolatum, the metallic promoter, if one is employed, and the catalyst in a reactor equipped with a mixing device, adding the ethylene, heating to a reaction temperature, while mixing the contents of the reactor, cooling after a suitable period of time and recovering the product.

The preferred method of operation is of the continuous type. In this method of operation the ethylene, petrolatum, promoter, and catalyst are continuously charged to a reactor maintained under suitable conditions of temperature and pressure. The reactor may be an unpacked vessel or it may contain an adsorbent packing material, such as fire brick, alumina, dehydrated bauxite, and the like, upon which the catalyst is deposited and retained. Instead of charging the metal to the reaction zone together with the other reactants, the metal may be placed in the reactor and the ethylene, petrolatum and peroxide may be passed over it. The product is separated from the reactor effluent and any unconverted ethylene may be recycled to the reaction zone. If a product of higher melting point is desired, a portion of the product also may be recycled to the reaction zone.

Another mode of operation that may be used is the fluidized type wherein the charge is passed through a bed of finely divided adsorbent material or promoter thereby causing the solid material to become motionalized and forming a fluid-like mass. A portion of the adsorbent may be continuously withdrawn from the reaction zone, cooled, and returned thereto; thus providing an efficient method for removing the heat of reaction.

Instead of separately adding the peroxide catalyst to the reaction zone, I have found that frequently it is more desirable and economical to form the catalyst in situ in the petrolatum and then charge it to the reaction zone together with the ethylene. Formation of the peroxide in the petrolatum may be accomplished by autooxidation, i. e., by heating the hydrocarbon while air is bubbled through it, preferably in the presence of a trace of peroxide from a previous autooxidation. Alternatively, the air may be passed through the hydrocarbon in the presence of an oxidation catalyst such as magnesium stearate. In some cases it will be beneficial to add a minor amount of olefinic or cycloolefinic hydrocarbons to the petrolatum before passing therethrough.

In the continuous method of carrying out my process, the catalyst preferably is added continuously to the reaction zone, but, if desired, it may be added intermittently, particularly when a packing material which retains catalyst is employed in the reactor.

The temperature employed in the process of this invention should be at least as high as the initial decomposition temperature of the peroxide used as the catalyst. In the case of tertiary butyl perbenzoate, for example, the decomposition temperature is approximately 115° C. Higher temperatures may be employed but little advantage is gained if the temperature is more than about 150° C. higher than the decomposition temperature of the catalyst. Although rather low pressures may be employed in my process, I prefer to use at least 15 atmospheres. Pressure as high as 500 atmospheres may be used but the preferred range is from about 30 to about 100 atmospheres.

The concentrations of catalyst utilizable in my process can vary over a wide range. For reasons of economy, it generally is desirable to use low concentrations such as from about 0.1% to about 5% of the ethylene charged. Higher concentrations of catalyst usually tend to lower the molecular weight of the product and if such products are desired they may be prepared by using catalyst concentrations up to 15% or more.

In batch operation and in flow operations that do not employ packing materials, the contact time should be in the range of from about 3 minutes to about 6 hours. However, contact times of at least 10 minutes usually are preferred. In fixed bed operation a space velocity, defined as the volume of liquid charged per hour divided by the superficial volume of packing, should be in the range of from about 0.1 to about 10. The ratio of petrolatum to ethylene charged to the reaction zone may vary over a relatively broad range. In general, however, it is desired to condense more than one molecule of ethylene with one molecule of petrolatum, hence the molal ratio of ethylene to petrolatum usually will be greater than one. When a metallic promoter is used, the amount needed to obtain an improvement will depend to some extent upon the surface area per unit weight of said promoter. That is, the more finely divided the metal is, the less there is required for a given effect. In general, the most satisfactory results are obtained when the weight of metal charged to the reactor is approximately equal to or greater than the weight of catalyst charged.

The following example is given to illustrate my invention, but it is not introduced with the intention of unduly limiting the generally broad scope of said invention:

Example

Forty-two grams of a commercial petrolatum ("Blue Seal Vaseline") and 3 grams of tertiary butyl peroxide were placed in a glass liner in a rotating autoclave followed by the addition thereto of 50 atmospheres of ethylene. The autoclave was then heated to a temperature of 136° C. and rotated at that temperature for 4 hours, after which the autoclave was removed and the product recovered therefrom. The product was a solid that had a grease-like consistency and that melted at 74° C. The melting point of the petrolatum charged to the autoclave was 43–45° C. Thus it can be seen that in this experiment the melting point of a commercial petrolatum was substantially increased without any appreciable change in the consistency.

I claim as my invention:

1. The condensation product obtained by subjecting ethylene and a petrolatum to the action of an organic peroxide condensation catalyst at a temperature at least as high as the decomposition temperature of said catalyst.

2. The condensation product obtained by subjecting ethylene and a petrolatum to the action of an organic peroxide condensation catalyst at a temperature at least as high as the decomposition temperature of said catalyst in the presence of a metal selected from the group consisting of magnesium, zinc, cadmium, and mercury.

3. A method of increasing the melting point of petrolatum which comprises subjecting ethylene and a petrolatum to the action of an organic peroxide condensation catalyst at a temperature at least as high as the decomposition temperature of said catalyst.

4. A method of increasing the melting point of petrolatum which comprises subjecting ethylene and a petrolatum to the action of an organic peroxide condensation catalyst at a temperature at least as high as the decomposition temperature of said catalyst and in the presence of a metal selected from the group consisting of magnesium, zinc, cadmium and mercury.

5. A method of increasing the melting point of petrolatum which comprises subjecting ethylene and a petrolatum to the action of an organic peroxide condensation catalyst at a pressure above about 15 atmospheres and at a temperature of from about the decomposition temperature of said catalyst to about 150° C. higher than said decomposition temperature.

6. A method of increasing the melting point of petrolatum which comprises subjecting ethylene and a petrolatum to the action of an organic peroxide condensation catalyst at a pressure above about 15 atmospheres and at a temperature of from about the decomposition temperature of said catalyst to about 150° C. higher than said decomposition temperature and in the presence of a metal selected from the group consisting of magnesium, zinc, cadmium, and mercury.

7. A method of increasing the melting point of petrolatum which comprises subjecting ethylene and a petrolatum to the action of a hydrocarbon peroxide condensation catalyst at a pressure above about 15 atmospheres and at a temperature of from about the decomposition temperature of said catalyst to about 150° C. higher than said decomposition temperature.

8. A method of increasing the melting point of petrolatum which comprises subjecting ethylene and a petrolatum to the action of a hydrocarbon peroxide condensation catalyst at a pressure of from about the decomposition temperature of said catalyst to about 150° C. higher than said decomposition temperature and in the presence of a metal selected from the group consisting of magnesium, zinc, cadmium and mercury.

9. The process of claim 5 further characterized in that said organic peroxide catalyst comprises tertiary butyl perbenzoate.

10. The process of claim 7 further characterized in that said hydrocarbon peroxide catalyst comprises ditertiary butyl peroxide.

11. The process of claim 6 further characterized in that said organic peroxide catalyst comprises tertiary butyl perbenzoate.

12. The process of claim 8 further characterized in that said hydrocarbon peroxide catalyst comprises ditertiary butyl peroxide.

LOUIS SCHMERLING.

REFERENCES CITED

The following references are of record in the file of this patent:

UNITED STATES PATENTS

| Number | Name | Date |
| --- | --- | --- |
| 2,298,846 | Skooglund | Oct. 13, 1942 |
| 2,448,799 | Happoldt et al. | Sept. 7, 1948 |
| 2,450,451 | Schmerling | Oct. 5, 1948 |